(12) United States Patent
Buresi et al.

(10) Patent No.: US 8,893,742 B2
(45) Date of Patent: Nov. 25, 2014

(54) DOUBLE-SKIN NOZZLE SYSTEM, JUNCTION SYSTEM BETWEEN TWO TUBE PORTIONS, AND AIRCRAFT PROVIDED WITH SUCH A SYSTEM

(75) Inventors: Christophe Buresi, Toulouse (FR); Robert Rossato, Sainte Foy d'Aigrefeuille (FR); Serge Vernet, Pompignan (FR)

(73) Assignee: Airbus Operations S.A.S., Toulouse (FR)

( * ) Notice: Subject to any disclaimer, the term of this patent is extended or adjusted under 35 U.S.C. 154(b) by 8 days.

(21) Appl. No.: 13/538,476

(22) Filed: Jun. 29, 2012

(65) Prior Publication Data
US 2013/0000747 A1     Jan. 3, 2013

(30) Foreign Application Priority Data

Jul. 1, 2011 (FR) .................................. 11 55965

(51) Int. Cl.
*F16K 23/00*     (2006.01)
*F16L 9/19*     (2006.01)

(52) U.S. Cl.
CPC ............... *F16L 9/19* (2013.01); *F16L 2201/30* (2013.01)
USPC ............... 137/312; 285/13; 73/40; 244/135 A

(58) Field of Classification Search
USPC ............... 137/312; 138/104, 114; 285/13, 95; 73/40, 40.5 R, 46; 244/135 A
See application file for complete search history.

(56) References Cited

U.S. PATENT DOCUMENTS

| 4,723,441 | A | | 2/1988 | Sweeney |
|---|---|---|---|---|
| 5,419,593 | A | * | 5/1995 | Greene et al. ............... 285/123.1 |
| 5,433,484 | A | * | 7/1995 | Ewen et al. .................. 285/21.2 |
| 5,497,809 | A | * | 3/1996 | Wolf .............................. 138/113 |
| 5,709,389 | A | * | 1/1998 | Algers et al. .................. 277/500 |
| 5,714,681 | A | * | 2/1998 | Furness et al. ............. 73/40.5 R |
| 6,446,661 | B2 | * | 9/2002 | Armenia et al. ............... 137/312 |
| 6,487,860 | B2 | * | 12/2002 | Maysersky et al. .............. 60/739 |
| 2010/0018599 | A1 | * | 1/2010 | Ferrer et al. .................. 138/112 |

OTHER PUBLICATIONS

French Preliminary Search Report and Written Opinion issued Feb. 27, 2012 in corresponding French Application No. 11 55965 filed on Jul. 1, 2011 (with an English Translation of Categories).

* cited by examiner

*Primary Examiner* — John K Fristoe, Jr.
*Assistant Examiner* — Kevin Barss
(74) *Attorney, Agent, or Firm* — Oblon, Spivak, McClelland, Maier & Neustadt, L.L.P.

(57) ABSTRACT

A double-skin nozzle system including an internal tube for transporting a liquid, formed by a plurality of tube portions connected to one another by removable junction systems, an external tube positioned around the internal tube and formed by a plurality of tube portions connected to one another by junction systems, wherein at least two junction systems each include a blocking device for blocking, along the external tube, the flow of a liquid coming from a leak from the internal tube, and at least one drain for removing the liquid coming from the leak from the internal tube.

8 Claims, 4 Drawing Sheets

DOUBLE-SKIN NOZZLE SYSTEM,
JUNCTION SYSTEM BETWEEN TWO TUBE
PORTIONS, AND AIRCRAFT PROVIDED
WITH SUCH A SYSTEM

TECHNICAL FIELD OF THE INVENTION

The invention pertains to a double-skin nozzle system as well as the junction system between two corresponding tube portions.

The invention finds particularly advantageously application in the field of aeronautics for transporting a liquid, such as fuel, from one point of an aircraft to another.

PRIOR ART

FIG. 1 shows a double-skin system 1 comprising in a known way, an internal tube 2 transporting a liquid and an empty external tube 3 positioned around the internal tube 2. This function of the external tube 3 is to convey the liquid towards a drain 15 in the event of breakage of the internal tube 2.

Since the tubes 2, 3 are generally several tens of meters long, for example 30 meters for the Airbus A380 (registered mark), they are formed by tube portions connected to one another by removable-sleeve junctions to facilitate their assembly. Thus, the internal tube 3 is formed by tube portions 5 connected to one another by means of removable-sleeve junctions 6. The external tube 3 is formed by tube portions 9 connected together by means of removable-sleeve junctions 12.

In a known way, the removable sleeves 6, 12 are provided with a seal at their internal periphery cooperating with a corresponding tip of a tube portion. The sleeves 6, 12 can be shifted in translation relatively to the tube to enable access to the interior of the tube as well as to enable their replacement.

Since the system 1 has only one drain 15, the external tube 3 is contaminated throughout its length if a seal of a junction 6 of the internal tube 2 becomes defective because of wear and tear or if it should get torn during the assembling of the system.

The maintenance operation is then very lengthy inasmuch as the operator has to clean the tube system entirely throughout its length and verify all the junctions to find the one that is defective.

OBJECT OF THE INVENTION

It is an aim of the invention to limit the zone of contamination in order to facilitate the detection of the defective junction, and reduce the time needed to clean the tube system.

To this end, the system comprises at least two junction systems between two portions of the external tube, each having a blocking device providing for the blocking, along the external tube, of the flow of a liquid coming from a leakage of the internal tube, and at least one drain providing for the removal of this liquid.

The invention therefore pertains to a double-skin nozzle system characterized in that it comprises:
an internal tube for transporting a liquid,
an external tube positioned around the internal tube formed by a plurality of tube portions connected to one another by means of junction systems,
characterized in that at least two junction systems each comprise:

a blocking device for blocking, along the external tube, the flow of a liquid coming from a leak from the internal tube, and
at least one drain for removing the liquid coming from the leak from the internal tube.

According to one embodiment, the junction system comprises a body and at least one sleeve connected on the one hand to a portion of the external tube and on the other hand to the body.

According to one embodiment, with the junction system comprising two sleeves positioned on either side of the body, the junction system comprises in addition two drains opening into the body positioned on either side of the blocking device, these two drains being connected to a single drain.

According to one embodiment, the blocking device is fixedly joined to the external periphery of the internal tube and comprises a flange extending radially on at least one part of the circumference of the internal tube.

According to one embodiment, the blocking device is fixedly joined to the body so as to limit the shifts of the internal tube inside the external tube.

According to one embodiment, the body comprises a radial internal shoulder, the flange being fixed to this shoulder.

According to one embodiment, the blocking device comprises at least one aperture to provide for a passage of air to the interior of the external tube.

According to one embodiment, the junction system comprises a holding arm that is to be connected to a structural element of an aircraft.

The invention furthermore pertains to a junction system for joining two tube portions characterized in that it comprises a blocking device for the blocking, along the tube, of a liquid flowing along the tube and at least one drain providing for the removal of the fluid.

The invention also pertains to an aircraft characterized in that it comprises a double-skin nozzle system according to the invention.

BRIEF DESCRIPTION OF THE FIGURES

The invention will be understood more clearly from the following description and the accompanying figures. These figures are given purely by way of an illustration but in no way restrict the scope of the invention. They show.

The identical, similar or analogous systems keep the same references from one figure to another.

DESCRIPTION OF EXAMPLES OF EMBODIMENTS OF THE INVENTION

Figure 1:
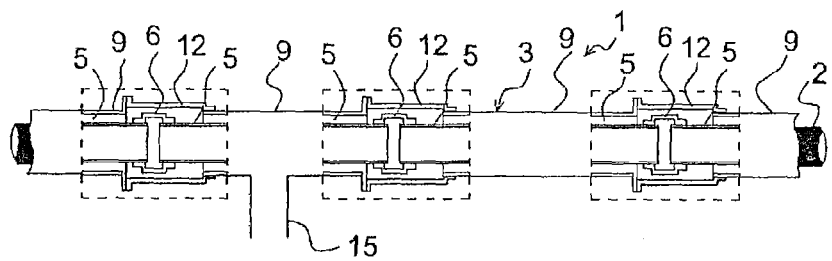
FIG. 1 (already described): a schematic representation of a double-skin nozzle system according to the prior art, the junctions of which are shown in a longitudinal section.

FIG. 1 shows a double-skin system 1' according to the invention comprising an internal tube 2 transporting a liquid, such as fuel, and an empty external tube 3 positioned around the internal tube 2 providing for a passage of air. The term "positioned around" is understood to mean that the internal tube 2 is positioned inside the external tube 3. The function of the tube 3 is to convey liquid towards one of the drains 43 in the event of breakage of the internal tube 2. The tubes 2 and 3 preferably have a round cross-section and a common axis of symmetry X. Preferably, the internal tube 2 is made out of a fire-resistant material such as for example titanium, while the external tube 3 is made out of aluminum.

The tubes 2 and 3 are generally several tens of meters long. They are formed by tube sections connected to one another by means of removable junctions. Thus, the tube 2 is formed by tube portions 5 connected one another by means of junctions 6. The external tube 3 is formed by tube portions 9 connected to one another by means of junctions systems 18. The junctions 6 of the internal tube 2 are located along the length of the tubes substantially at the same level as the junction systems 18 of the external tube 3.

More specifically, each of the junctions 6 has a removable sleeve 10 enabling two adjacent portions 5 of the internal tube 2 to be joined. For this purpose, the ends of two adjacent portions 5 are inserted through a tip of each side of the sleeve 10 which is provided, on its internal periphery, with a sliding seal. A circlip system is furthermore positioned around the sleeve 10 to enable a tightly sealed and fixed joining between two adjacent portions 5.

Figure 2:
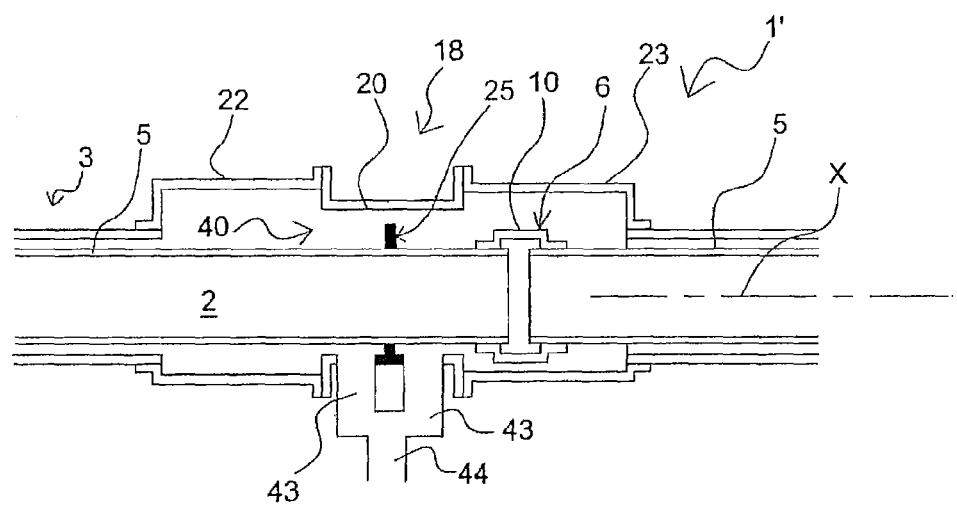
FIG. 2: a schematic longitudinal view in section of a double-skin tube system according to the invention.
Figure 3A:
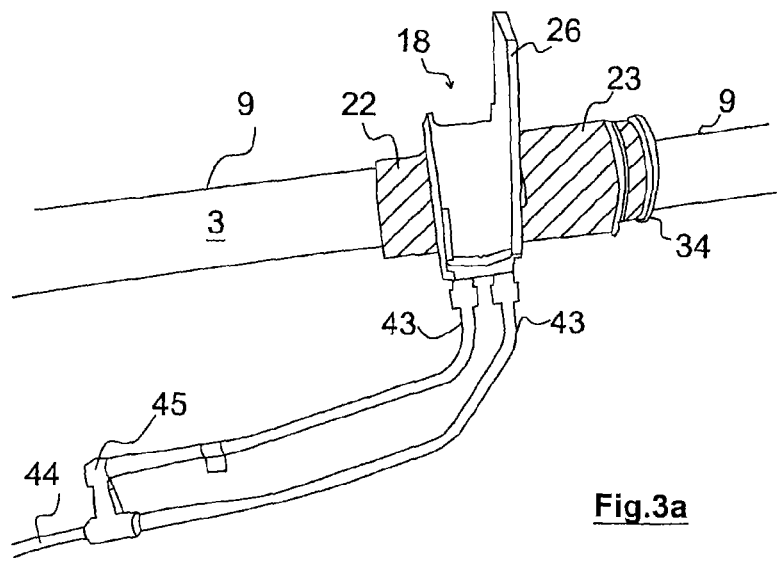
FIGS. 3a, 3b: 3D views of a junction system according to the invention installed between two portions of the external tube.

Besides, the junction systems 18 each comprise a body 20 connected to a holding arm 26 and at least one sleeve. This body 20 has an axis which coincides with the axis X (cf. FIG. 4). As it happens, the junction system 18 shown in FIGS. 2, 3a and 4 comprise two removable sleeves 22, 23 positioned on either side of the body 20. Each sleeve 22, 23 has one of its ends provided with a sliding seal connected to a tip of a portion 9 of the tube 3. A circlip system 34 (cf. FIG. 3a) is positioned inside a groove referenced 21 in FIG. 4 to provide for a fixed and tightly sealed joining between the end of the portion and the end of the sleeve 22, 23. Besides, the other end of the sleeve 22, 23 has a radial shoulder 24 cooperating with one end of the body 20 by means of an O-ring 24.1 positioned inside an annular groove made in the body 20. Furthermore, the end of the sleeve 22, 23 carrying the shoulder 24 is fixedly joined to the body 20, for example by the screwing in of bolts cooperating with the apertures 24.2 which can be seen in FIG. 5. These apertures 24.2 are distributed circumferentially around the body 20, some of them being made in the holding arm 26.

As an alternative, the removable sleeve 22, 23 is replaced by a fixed sleeve having one of its ends soldered to the corresponding external tube portion. The fixed sleeve is connected to the body 20 by its other end by means of a screwing system for example. In this case, to access the internal tube 2, the entire portion 9 of the external tube 3 is dismounted by disconnecting the sleeve from the end of the body 20.

Figure 3B:
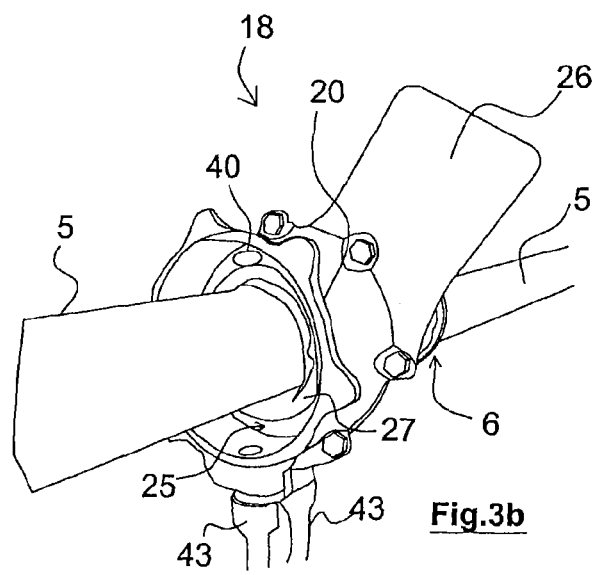
Figure 4:
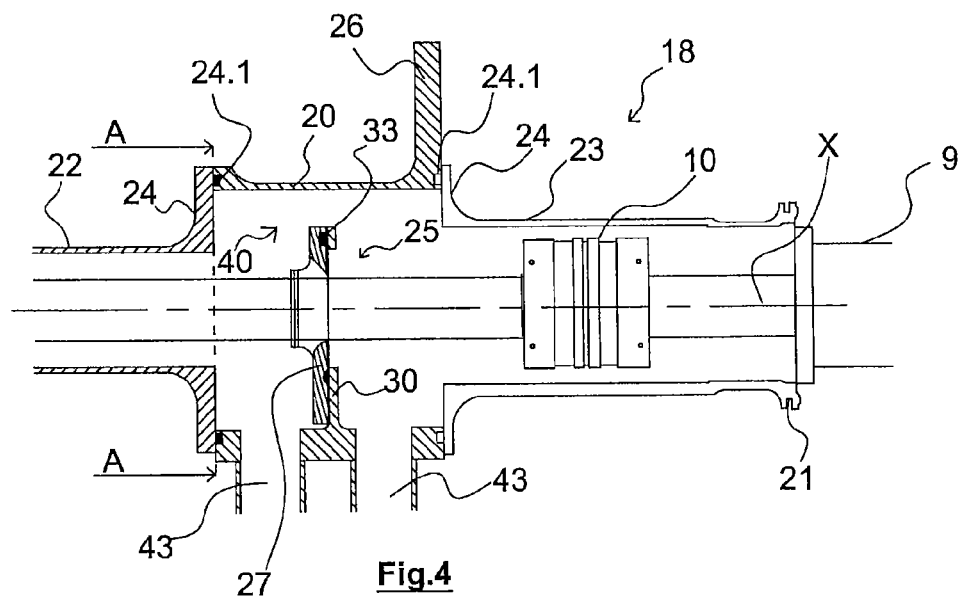
FIG. 4: a view in longitudinal section of the junction system of FIGS. 3a and 3b.
Figure 5:
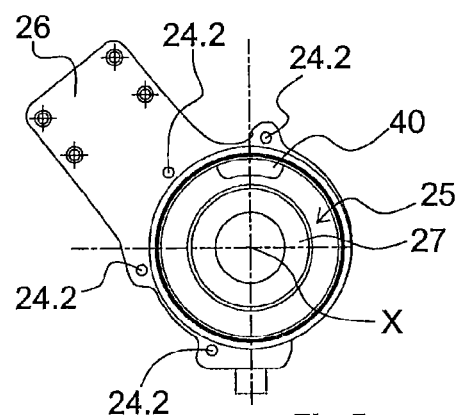
FIG. 5: a view along the cross-section A-A of FIG. 4.

The junction systems 18 furthermore have a blocking device 25 to ensure the blocking, within the external tube 3, of the flow of liquid coming from a leakage of the internal tube 2. As shown in FIGS. 3b, 4 and 5, the blocking device 25 fixed to the external periphery of the internal tube 2 has a flange 27 extending radially between the external surface of the internal tube 2 and the internal surface of the external tube 3. Preferably, the flange 27 extends over the entire circumference of the tube 2 so as to fill the space between the internal tube 2 and the external tube 3. A through aperture 40 is made through the wall of the flange 27 to ensure a passage of air into the external tube 3. This aperture 40 is preferably situated at one end of the flange 27 at a distance from the axis X. If no airing is needed, the aperture 40 is eliminated, and the flange 27 is then solid.

In a variant, the flange 27 extends on at least half of the circumference of the tube 2 situated in the lower part of the tube 2. The upper part and the lower part of the tube 2 are considered to be demarcated by a horizontal plane passing through the axis X. The fastening of the blocking device 25 to the internal tube 2 is preferably done by soldering.

As can be seen in FIG. 4, the body 20 furthermore has an internal shoulder 30 situated between the drains 43 and extending radially relatively to the axis X from the internal periphery of the body 20 towards the interior of the body 20. The flange 27 is fixed to this shoulder 20 for example by means of screws (not shown) distributed around the flange 27. Furthermore, in order to provide for a tightly sealed assembly between the flange 27 and the shoulder 30, an O-ring 33 is positioned inside an annular groove made in the flange 27. The fixed link between the internal tube 2 and the body 20 via the flange 27 limits the movements of the tube 2 inside the external tube 3.

Besides, the junction system 18 has two drains 43 positioned on either side of the blocking device 25. These drains 43 open out by one of their ends into the body 20 and are connected by another one of their ends to a single drain 44, if necessary by means of a linking device 45 (cf. FIG. 3a).

In one embodiment, the holding arm 26 which can be seen especially in FIG. 5 has for example the shape of a plate extending along a vertical plane perpendicular to the axis X. The arm 26 is fixed by one of its ends to the external surface of the body 20 and is capable of being connected by its other end to a structural element of the aircraft (not shown). Preferably, the arm 26 forms one piece with the body 20. Such an arm 26 provides for the guiding and fastening of the external tube 3 inside the aircraft. In a reverse configuration, the holding arm 26 forms one piece with a structural element of the aircraft and has one end provided with a means for fastening to the body 20.

Figure 6:
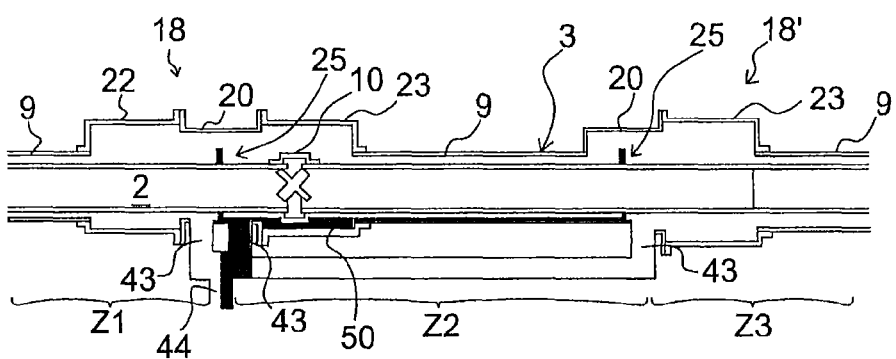
FIG. 6: a view in longitudinal section of a double-skin nozzle system according to the invention comprising an external tube along which three isolation zones have been defined.

As a variant, certain junction systems 18' of the system 1', as shown in FIG. 6, have a body 20, only one sleeve 23 and only one drain 43 connected to the single drain 44.

The fact that the blocking devices 25 are evenly spaced out throughout the length of the external tube 3 demarcates, along the external tube 3, zones isolated from one another, extending between two successive blocking devices 25 or between one end of the tube 3 and a blocking device 25. A drain 43 is associated with each zone thus demarcated. As a consequence, in the event of a breakage of a junction 6 of the internal tube 2, the operator can identify and take swift action on the defective zone of the tube 2, without having to decontaminate the entire external tube 3.

Thus, FIG. 6 defines a first zone Z1 situated to the left of the blocking device 25 of the junction 18, a second zone Z2 situated between the blocking device 25 of the junction 18 and the blocking device 25 of the junction 18', as well as a third limiting zone Z3 situated to the right of the blocking device 25 of the junction 18'.

Should a seal of the junction 6 become defective (through wear and tear or following the assembly of the nozzle system), the liquid 50 (represented by a dark portion) coming from the tube flows by gravity into the zone Z2 and is removed towards the drain 44 by means of the drain 43 associated with the zone Z2. The operator can then unfix the sleeve 23 by unscrewing the corresponding screws situated around the body 20 and loosening the circlips of the other end of the sleeve 23 so as to make the sleeve 23 slide along the external tube 3. He could thus easily have access to the defective junction 6 in order to replace it. Furthermore, the operator will have to clean only the portion 9 of the external tube 3 of the zone Z2, since the other portions Z1 and Z3, thanks to the blocking devices 25, have not been contaminated by leakage.

The number of zones of the external tube 3 isolated from one another is naturally not limited to three. Indeed, depending on the number of blocking devices 25 used, it is possible to define a number of zones isolated from one another greater than or smaller than 3.

It can also be noted that the junctions between two adjacent portions 9 of the external tube 3 are not all necessarily provided with a blocking device 25 because this would unnecessarily increase the cost of the nozzle system. Indeed, only the junctions 18, 18' needed to define the number of isolated zones desired are provided with a blocking device, the others being made classically by means of a sliding sleeve similar to the sleeve 10 well-known to those skilled in the art. Thus, in one example of an embodiment, one junction in every three is provided with a blocking device.

In this document, the relative terms "lower", "upper", "horizontal", "vertical" are understood with reference to a double-skinned nozzle system 1' according to the invention installed in an aircraft when this aircraft is in parked position, the nozzle system 1' extending substantially in parallel to the ground of the runway.

The invention claimed is:

1. A double-skin nozzle system comprising:
   an internal tube for transporting a liquid, the internal tube including a plurality of tube portions connected to one another by removable internal junction systems,
   an external tube positioned around the internal tube, the external tube including a plurality of tube portions connected to one another by external junction systems,
   wherein at least two external junction systems each comprise:
   a body and two sleeves positioned on either side of the body, each of the two sleeves being connected to a portion of the external tube and to the body,
   a blocking device for blocking, along the external tube, a flow of a liquid coming from a leak from the internal tube,
   a single drain outlet, and
   at least one drain opening disposed on either side of the blocking device for removing the liquid coming from the leak from the internal tube, each of the at least one drain opening disposed on either side of the blocking device being connected to the single drain outlet.

2. The system according to claim 1, wherein each blocking device is fixedly joined to an external periphery of the internal tube and includes a flange extending radially on at least one part of a circumference of the internal tube.

3. The system according to claim 2, wherein the body comprises a radial internal shoulder, the flange being fixed to the radial internal shoulder.

4. The system according to claim 3, wherein the flange includes an annular groove for housing an O-ring, and
   wherein the O-ring is sandwiched between the flange and the radial internal shoulder.

5. The system according to claim 1, wherein each blocking device is fixedly joined to the body so as to limit shifting of the internal tube inside the external tube.

6. The system according to claim 1, wherein each blocking device includes at least one aperture to provide a passage of air to an interior of the external tube.

7. The system according claim 1, wherein each external junction system includes a holding arm to connect to a structural element of an aircraft.

8. An aircraft comprising a double-skin nozzle system according to claim 1.

* * * * *